3,077,492
(SULFOPHENOXY)ALKOXY-SUBSTITUTED AROMATIC DICARBOXYLIC ACIDS AND DERIVATIVES THEREOF
Christian F. Horn, South Charleston, W. Va., assignor to Union Carbide Corporation, a corporation of New York
No Drawing. Filed Nov. 1, 1961, Ser. No. 149,206
9 Claims. (Cl. 260—470)

This invention relates to the production and use of novel compounds, viz., sulfophenoxyalkoxy-substituted aromatic dicarboxylic acids, their alkali metal sulfonate salts, and the dialkyl carboxylate diesters thereof.

More particularly, the novel compounds of this invention can be represented by the generic formula:

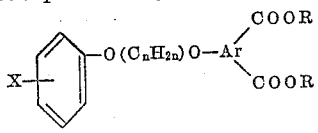

wherein X designates a sulfo(—$SO_3H$) or metallosulfo (—$SO_3M$) radical; M designates an alkali metal atom, as for instance, a lithium, sodium, potassium, rubidium or cesium atom, etc., and preferably designates an alkali metal atom having an atomic number of from 3 to 19, i.e., a lithium, sodium or potassium atom; $n$ designates an integer of from 1 to about 12, and preferably from 1 to about 8; Ar designates an arenyl radical, i.e., a trivalent aromatic hydrocarbon radical, such as a phenenyl or naphthenyl radical, etc.; and R designates a hydrogen atom or an alkyl radical containing from 1 to about 8 carbon atoms, such as methyl, ethyl, propyl, butyl, isobutyl, pentyl, hexyl, 2-methylpentyl, 2-ethylbutyl, heptyl, octyl, or 2-ethylhexyl radical, etc., of which the lower alkyl radicals containing from 1 to about 4 carbon atoms are preferred.

As typical of the novel compounds of this invention, there can be mentioned:

4-(2-[4-sulfophenoxy]ethoxy)phthalic acid
4-(2-[4-((sodiumsulfo))phenoxy]ethoxy)phthalic acid
5-(2-[4-sulfophenoxy]ethoxy)terephthalic acid
5-(2-[4-((lithiumsulfo))phenoxyl]ethoxy)terephthalic acid
5-([4-sulfophenoxy]methoxy)isophthalic acid
5-([4-((potassiumsulfo))phenoxy]methoxy)isophthalic acid
5-(2-[4-sulfophenoxy]ethoxy)isophthalic acid
5-(2-[4-((sodiumsulfo))phenoxy]ethoxy)isophthalic acid
5-(2-[3-sulfophenoxy]ethoxy)isophthalic acid
5-(2-[3-((lithiumsulfo))phenoxy]ethoxy)isophthalic acid
5-(3-[4-sulfophenoxy]propoxy)isophthalic acid
5-(3-[4-((potassiumsulfo))phenoxy]propoxy)isophthalic acid
5-(4-[4-sulfophenoxy]butoxy)isophthalic acid
5-(4-[4-((sodiumsulfo))phenoxy]butoxy)isophthalic acid
5-(6-[4-sulfophenoxy]hexoxy)isophthalic acid
5-(6-[4-((lithiumsulfo))phenoxy]hexoxy)isophthalic acid
5-(8-[4-sulfophenoxy]octoxy)isophthalic acid
5-(8-[4-((potassiumsulfo))phenoxy]octoxy)isophthalic acid
5-(2-ethyl-6-[4-sulfophenoxy]hexoxy)isophthalic acid
5-(2-ethyl-6-[4-((sodiumsulfo))phenoxy]hexoxy)isophthalic acid
5-(12-[4-sulfophenoxy]dodecoxy)isophthalic acid
5-(12-[4-((lithiumsulfo))phenoxy]dodecoxy)isophthalic acid
6-(2-[4-sulfophenoxy]ethoxy)1,4-naphthalene dicarboxylic acid
6-(2-[4-((potassiumsulfo))phenoxy]ethoxy)1,4-naphthalene dicarboxylic acid Dimethyl 4-(2-[sulfophenoxy]ethoxy)phthalate
Dimethyl 4-(2-[4-((sodiumsulfo))phenoxy]ethoxy)phthalate
Dimethyl 5-(2-[4-sulfophenoxy]ethoxy)terephthalate
Dimethyl 5-(2-[4-((lithiumsulfo))phenoxy]ethoxy)terephthalate
Dimethyl 5-([4-sulfophenoxy]methoxy)isophthalate
Dimethyl 5-([4-((potassiumsulfo))phenoxy]methoxy)isophthalate
Octyl 5-(2-[4-sulfophenoxy]ethoxy)isophthalate
Octyl 5-(2-[4-((sodiumsulfo))phenoxy]ethoxy)isophthalate
Di(2-ethylhexyl) 5-(2-[3-sulfophenoxy]ethoxy)isophthalate
Di(2-ethylhexyl) 5-(2-[3-((lithiumsulfo))phenoxy]ethoxy)isophthalate
Butyl 5-(3-[4-sulfophenoxy]propoxy)isophthalate
Butyl 5-(3-[4-((potassiumsulfo))phenoxy]propoxy)isophthalate
Dipropyl 5-(4-[4-sulfophenoxy]butoxy)isophthalate
Dipropyl 5-(4-[4-((sodiumsulfo))phenoxy]butoxy)isophthalate
Diethyl 5-(6-[4-sulfophenoxy]hexoxy)isophthalate
Diethyl 5-(6-[4-((lithiumsulfo))phenoxy]hexoxy)isophthalate
Dimethyl 5-(8-[4-sulfophenoxy]octoxy)isophthalate
Dimethyl 5-(8-[4-((potassium sulfo))phenoxy]octoxy)isophthalate
Dimethyl 5-(2-ethyl-6-[4-sulfophenoxy]hexoxy)isophthalate
Dimethyl 5-(2-ethyl-6-[4-((sodiumsulfo))phenoxy]hexoxy)isophthalate
Dimethyl 5-(12-[4-sulfophenoxy]dodecoxy)isophthalate
Dimethyl 5-(12-[4-((lithiumsulfo))phenoxy]dodecoxy)isophthalate
Dimethyl 6-(2-[4-sulfophenoxy]ethoxy)1,4-naphthalene dicarboxylate
Dimethyl 6-(2-[4-((potassiumsulfo))phenoxy]ethoxy)1,4-naphthalene dicarboxylate The present invention is especially concerned with the production and use of the sulfophenoxyalkoxyphthalic acids (including the iso-, and terephthalic acids), their alkali metal sulfonate salts, and the dialkyl carboxylate diesters thereof represented by the sub-generic formula:

(II)

$$X \!-\!\!\bigcirc\!\!-\!O(C_nH_{2n})O\!-\!\!\bigcirc\!\!\begin{array}{c}COOR\\ \\COOR\end{array}$$

wherein X, $n$ and R are as defined above.

The novel compounds of this invention can be obtained by various methods, which, it is to be noted, in no way limit the invention. The phthalic acid derivatives represented above by Formula II can, for example, be obtained by steps which include the sulfonation of a member of a known class of compounds, viz., the phenoxyalkoxyphthalic acids and dialkyl carboxylate diesters thereof represented by the formula:

(III)

$$\bigcirc\!\!-\!O(C_nH_{2n})O\!-\!\!\bigcirc\!\!\begin{array}{c}COOR\\ \\COOR\end{array}$$

wherein $n$ and R are as defined above. As typical of such compounds, there can be mentioned:

4-(2-phenoxyethoxy)phthalic acid
5-(2-phenoxyethoxy)terephthalic acid
5-(phenoxymethoxy)isophthalic acid
5-(2-phenoxyethoxy)isophthalic acid 5-(3-phenoxypropoxy)isophthalic acid
5-(4-phenoxybutoxy)isophthalic acid
5-(6-phenoxyhexoxy)isophthalic acid
5-(8-phenoxyoctoxy)isophthalic acid
5-(2-ethyl-6-phenoxyhexoxy)isophthalic acid
5-(12-phenoxydodecoxy)isophthalic acid
Dimethyl 4-(2-phenoxyethoxy)phthalate
Dimethyl 5-(2-phenoxyethoxy)terephthalate
Dimethyl 5-(phenoxymethoxy)isophthalate
Dioctyl 5-(2-phenoxyethoxy)isophthalate
Di(2-ethylhexyl) 5-(2-phenoxyethoxy)isophthalate
Dibutyl 5-(3-phenoxypropoxy)isophthalate
Dipropyl 5-(4-phenoxybutoxy)isophthalate
Diethyl 5-(6-phenoxyhexoxy)isophthalate
Dimethyl 5-(8-phenoxyoctoxy)isophthalate
Dimethyl 5-(2-ethyl-6-phenoxyhexoxy)isophthalate
Dimethyl 5-(12-phenoxydodecoxy)isophthalate Moreover, while reference is hereinafter made, for illustrative purposes, to the production of the phthalic acid derivatives of this invention, i.e., the compounds represented above by Formula I wherein Ar designates a phenenyl radical, the disclosure is also applicable to the corresponding naphthalene dicarboxylic acid derivatives. Thus, for instance, compounds represented by the formula:

(IV)

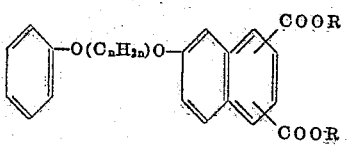

wherein $n$ and $R$ are as defined above, such as 7-(2-phenoxyethoxy)-1,5-naphthalene dicarboxylic acid and dimethyl 7-(2-phenoxyethoxy)-1,5-naphthalene dicarboxylate can also be employed as starting materials or precursors.

The phenoxyalkoxyphthalic acids and esters hereinabove described can themselves be otained, for example, by the reaction of a phenoxyalkylhalide with an alkali metal di(carboxy)- or dicarboalkoxy)phenolate in accordance with the equation:

(V)

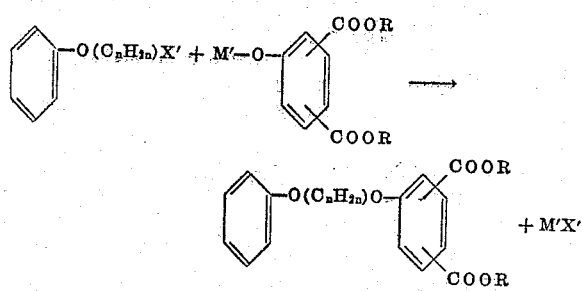

wherein $M'$ designates an alkali metal atom, such as a sodium atom, etc., $X'$ designates a halogen atom, such as a chlorine or bromine atom, etc., and $n$ and $R$ are as defined above. Such a reaction can be carried out by bringing the halide and the phenolate into reactive admixture in a suitable solvent, such as ethanol, N,N-dimethylformamide, dioxane, etc., and at a temperature of from about 20° C. to about 100° C., or higher. The phenoxyalkoxyphthalic acid or ester product can thereafter be recovered in any convenient manner, such as by crystallization and filtration, by isolation as a residue product upon evaporation or distillation of any solvent present, etc.

The sulfonation of the phenoxyalkoxyphthalic acid or ester represented above by Formula III, so as to produce the corresponding sulfophenoxyalkoxyphthalic acid or ester represented above by Formula II, wherein X designates the sulfo radical, can be carried out by known sulfonation procedures. Thus, for example, the phenoxyalkoxyphthalic acid or ester can be sulfonated by reaction with a mild sulfonating agent comprised of a mixture of sulfuric acid and acetic anhydride, at a temperature of from about −15° C. to about 50° C., and preferably from about 0° C. to about 25° C. The phenoxyalkoxyphthalic acid or ester, of which the latter is preferably employed, is best introduced to the sulfonating agent in solution, using, by way of illustration, an inert solvent such as methylene dichloride, ethylene dichloride, ethyl acetate, or the like. The mole ratio of sulfuric acid to acetic anhydride in the sulfonating agent can vary from about 0.1 to about 1 mole of sulfuric acid per mole of acetic anhydride, with a ratio of from about 0.2 to about 0.6 mole of sulfuric acid per mole of acetic anhydride being preferred. The mole ratio of sulfuric acid to the phenoxyalkoxyphthalic acid or ester can vary from about 0.5 to about 5 moles of sulfuric acid per mole of the phenoxyalkoxyphthalic acid or ester, with a ratio of from about 0.8 to about 1.5 moles of sulfuric acid per mole of the phenoxyalkoxyphthalic acid or ester being preferred.

Produced as hereinabove described, the sulfonated phenoxyalkoxyphthalic acid or ester product can be recoverd, if desired, in any convenient manner, such as that described above in connection with the recovery of the unsulfonated product. Moreover, while the para-substituted derivative in which the sulfo radical is located at the 4-position of the phenyl ring is most readily produced, other sulfonated derivatives, i.e., the ortho- or meta-substituted derivatives, are also often formed, or can be obtained by varying the sulfonation reaction in a manner determinable by those skilled in the art in light of this disclosure.

When the starting material employed is the free phthalic acid, i.e., when R of Formula IV is hydrogen, the sulfonated product can readily be converted to the corresponding dialkyl dicarboxylate by esterification in conventional manner with an alkyl alcohol containing from 1 to about 8 and preferably from 1 to about 4 carbon atoms. The presence of the sulfo radical during the esterification serves to catalyze the reaction (auto-catalysis), thus obviating the incorporation of an additional esterification catalyst.

The sulfonated phenoxyalkoxyphthalic acid or ester can thereafter be reacted with an alkali metal hydroxide or alkoxide, or an alkali metal salt of an acid weaker than sulfonic acid, such as acetic acid or benzoic acid, etc., to form the corresponding alkali metal sulfonate salt, i.e., metallosulfo derivative. Preferably, such a reaction is carried out in an alcoholic or aqueous solution, and at a temperature of from about 5° C. to about 110° C., and preferably from about 20° C. to about 50° C.

The mole ratio of alkali metal hydroxide, alkoxide or salt to the sulfophenoxyalkoxyphthalic acid or ester can vary from about 1 to about 10 moles of the alkali metal-containing compound per mole of the sulfophenoxyalkoxyphthalic acid or ester, with a ratio of from about 1 to about 2.5 moles of the alkali metal hydroxide, alkoxide, or salt per mole of the sulfophenoxyalkoxyphthalic acid or ester being preferred. Moreover, when the sulfonated product undergoing reaction is the phthalate diester, the conversion of the product to the alkali metal sulfonate derivative can be effected conveniently by titration with alkali metal hydroxide or alkoxide, preferably in alcoholic solution, to a pH of 7 to 8.

The alkali metal sulfonate salt thus produced can subsequently be recovered in any convenient manner, such as that described above in connection with the recovery of the unsulfonated phenoxyalkoxyphthalic acid or ester.

The novel compounds of this invention find use in a wide variety of applications. Such compounds can be used, for instance, as intermediates in the production of dyestuffs, pharmaceuticals, and ion exchange resins. In addition, the novel compounds of this invention are eminently suited for use as modifiers in the production of high melting, crystalline, linear polyesters, especially polyesters formed by the polycondensation reaction of terephthalic acid, or ester-forming derivative thereof, with an aliphatic diol, or ester-forming derivative thereof. The modified polyesters prepared in part from the compounds of this invention, and particularly from the alkali metal sulfonate derivatives of this invention, i.e., by the incorporation of the novel compounds of this invention in otherwise conventional polycondensation reaction mixtures, can, in turn, be employed to produce fibers which are readily dyeable with cationic and disperse dyestuffs by standard dyeing procedures. The dyed fibers thus obtained possess shades having good wash fastness and light fastness, as well as stability to conventional dry cleaning procedures. The modified polyesters, prepared in part from the compounds of this invention can also be used to produce films and molded articles.

That the novel compounds of this invention could be employed in the production of high-melting, crystalline, linear polyesters was surprising and unexpected since phenoxyalkoxyphthalic acids and esters, the basic structures of the compounds of this invention, ordinarily discolor and/or decompose when heated to the temperatures employed in making the polyesters. Thus, it was unexpected that the compounds of this invention would be sufficiently stable, both chemically and thermally, to withstand the polycondensation conditions in the presence of the other reactants, as well as the high temperatures necessary for reactating the polyesters. It was also surprising that the fibers produced from these polyesters showed no disadvantages in physical properties over the unmodified polyester fibers, and that they exhibited greatly enhanced dyeability properties, as well as many other desirable textile properties. The improved dyeability of the modified polyesters is believed due in no small part to the flexibility or rotatability of the sulfophenyl (or metallosulfphenyl) radical of the compounds of this invention about the adjacent oxygen atom, thereby making the sulfo (or metallosulfo) radical more accessible to the dye molecules during dyeing operations.

The following specific examples serve as further illustration of the present invention.

*Example I*

To 250 milliliters of ethanol, contained in a 500 milliliter, 4-necked flask equipped with a stirrer, thermometer, condenser and stopper, there were slowly added 10.8 grams of sodium methylate. The mixture was stirred until all of the sodium methylate was dissolved. Thereafter, 42 grams of dimethyl 5-hydroxyisophthalate were slowly added to the solution, which was then heated at reflux for a period of 20 minutes. Subsequently, 42 grams of phenoxyethyl bromide were slowly added to solution, and the resulting mixture was refluxed for a period of 3 hours. Upon completion of the reflux period, ethanol was distilled off to a kettle temperature of 94° C., accompanied by the formation of a sodium bromide precipitate. Heating was continued at a temperature of 94° C. for a period of 2 hours, whereupon additional ethanol was distilled off until the kettle temperature reached 130° C. The reflux condenser was removed and the mixture was heated at a temperature of 120° C. for a period of 1 hour, then allowed to stand overnight at room temperature. 250 milliliters of acetone were thereafter added to the mixture, which was then refluxed for a period of 10 minutes. Upon cooling, 20 grams of insoluble sodium bromide was filtered from the mixture. Acetone was removed from the filtrate by evaporation on a steam bath, and the residue was transferred to a distillation flask, whereupon unreacted phenoxyethyl bromide was distilled off to a kettle temperature of 185° C., under a reduced pressure of 4 millimeters of mercury. The residue was dissolved in 600 milliliters of diethyl ether, and resulting solution was washed with 200 milliliters of 5 percent aqueous sodium hydroxide, and then dried over anhydrous sodium sulfate. After the drying agent was removed by filtration, ether was removed from the filtrate by evaporation. In this manner, there were obtained about 42 grams of dimethyl 5-(2-phenoxyethoxy) isophthalate as a viscous liquid.

To a 4-necked flask similar to that described above, and equipped with a dropping funnel instead of a stopper, there were charged 28.5 grams of acetic anhydride. The anhydride was cooled to 0° C., whereupon 14 grams of sulfuric acid were added dropwise thereto, accompanied by stirring and continued cooling, so that the temperature of the resulting mixture was maintained at about 0° C. To this mixture, there was slowly added a solution containing 42 grams of dimethyl 5-phenoxyethoxyisophthalate, obtained as described above, dissolved in 200 milliliters of ethylene dichloride. After stirring the resulting solution for a period of 4 hours at a temperature maintained in the range of from 0° C. to 5° C., the solution was gradually warmed to room temperature over a 3-hour period. Thereafter, 200 milliliters of methanol were added to the solution, which was then refluxed for a period of 20 minutes to esterify the acid present, including the acetic anhydride component of the sulfonating agent. The solution was subsequently transferred to an evaporating dish, from which the solvent present was evaporated upon standing overnight. In this manner, dimethyl 5-(2-[4-sulfophenoxy]ethoxy)isophthalate was obtained as a residue product. The residue was then dissolved in 300 milliliters of methanol, transferred to a reaction flask, and refluxed for a period of 5 hours, while distilling off methyl acetate and any trace of ethylene dichloride still present. During the distillation, methanol was added to the solution to maintain a constant volume of about 400 milliliters. Thereafter, the solution was treated with charcoal, cooled to about room temperature and titrated with methanolic sodium hydroxide to a pH of 7.2. The mixture was diluted to 1.2 liters with methanol, heated to reflux and filtered while hot to remove traces of insoluble material. Methanol was then distilled off until approximately 400 milliliters of solution remained, whereupon the solution was cooled to room temperature. A precipitate was formed and was recovered by filtration. In this manner, 32 grams of dimethyl 5-(2-[4-((sodiumsulfo))phenoxy]ethoxy)isophthalate were obtained as a white, crystalline product having a melting point of 335–340° C. Analysis: Calculated for $$C_{18}H_{17}O_9SNa \cdot 0.5H_2O$$

C, 48.98; H, 4.11. Found: C, 49.98; H, 4.22. Infrared analysis was consistent with the identity of the product.

Such a product was subsequently employed as a modifier in the production of fiber-forming polyesters as follows. A mixture of 175 grams of dimethyl terephthalate, 3.95 grams of dimethyl 5-(2-[4-((sodiumsulfo))phenoxy]ethoxy)isophthalate, 180 grams of ethylene glycol, 0.06 gram of zinc acetate, and 0.018 gram of antimony oxide were charged to a reactor and heated at a temperature in the range of from 175° C. to 185° C. for a period of 6 hours to bring about an ester exchange, while distilling methanol formed during the reaction. Thereafter, the reaction mixture was heated at a temperature of 269° C. for a period of 2.5 hours to remove the glycol excess. The temperature was subsequently maintained in the range of 270° C. to 272° C. for a period of 5.75 hours to carry out the polycondenstation. During the reaction, a vigorous stream of nitrogen was passed through the melt at atmospheric presure. The crystalline polymer thus obtained had a melting point of 252–254° C., and was characterized by excellent dyeable fiber-forming and cold drawing properties. In like manner, dibutyl 5-(2-[4-((potassiumsulfo))phenoxy]ethoxy)isophthalate, produced by the sulfonation of dibutyl 5-(2-phenoxyethoxy)-isophthalate, followed by titration with potassium hydroxide, is also employed to produce modified, dyeable fiber-forming polyethylene terephthalate polyesters.

*Example II*

To 500 milliliters of ethanol, contained in a 2-liter, 4-necked flask equipped with a stirrer, thermometer, condenser, and stopper, there were slowly added 20.4 grams of sodium. The mixture was stirred until all the sodium was dissolved. Thereafter, 190 grams of dimethyl 2-hydroxyterephthalate were added to the solution, which was then heated to reflux. An additional 500 milliliters of ethanol was added at reflux. Subsequently, 243 grams of phenoxypentyl bromide were slowly added to the solution, and the resulting mixture was refluxed for a period of 10 hours, accompanied by the formation of sodium bromide as a precipitate. Upon completion of the reflux period, ethanol was distilled off to a kettle temperature of 140° C. Heating was continued at a temperature in the range of 135° C. to 140° C. for a period of 3 hours, whereupon the mixture was allowed to stand overnight at room temperature. To this mixture, 1 liter of diethyl ether was then added with stirring to dissolve the product, and 91 grams of insoluble sodium bromide was removed by filtration. Ether was removed from the filtrate by evaporation on a steam bath, and the residue was transferred to a distillation flask, whereupon unreacted phenoxypentyl bromide was distilled off to a kettle temperature of 180° C., under a reduced pressure of 2 milliliters of mercury. In this manner, dimethyl 2-(5-phenoxypentoxy)-terephthalate was obtained in an essentially quantitative yield as a water-clear viscous liquid. Analysis: Calculated for $C_{21}H_{24}O_6$: C, 67.72; H, 6.50. Found: C, 68.18; H, 7.07. Infrared analysis was consistent with the identity of the product.

To a 1-liter, 4-necked flask equipped with a stirrer, condenser, thermometer, an dropping funnel, there were charged 204 grams of acetic anhydride. The anhydride was cooled to a temperature of 0° C., whereupon 93 grams of sulfuric acid were added dropwise thereto, accompanied by stirring and continued cooling, so that the temperature of the resulting mixture was maintained at about 0° C. To this mixture, there were slowly added a solution containing 335 grams of dimethyl 2-phenoxypentoxyterephthalate, obtained as described above, dissolved in 300 milliliters of ethylene dichloride. After stirring the resulting solution for 4 hours at a temperature maintained in the range of from 0° C. to 5° C., the solution was gradually warmed to room temperature over a period of 1.5 hours. Thereafter, 200 milliliters of methanol were added to the solution, which was then refluxed for a period of 20 minutes. The solution was subsequently transferred to an evaporating dish, from which the solvent present was evaporated upon standing overnight. In this manner, dimethyl 2-(5-[4-sulfophenoxy]pentoxy)terephthalate was obtained as a residue product. The residue was then dissolved in 500 milliliters of methanol, transferred to a reaction flask, and refluxed for a period of 5 hours, while distilling off methyl acetate and any trace of ethylene dichloride still present. During the distillation, methanol was added to the solution to maintain a constant volume of about 850 milliliters. Thereafter, the solution was treated with charcoal and diluted to 1500 milliliters volume with methanol. An 850-milliliter portion of the solution was titrated with methanolic potassium hydroxide to a pH of 7.7. The mixture was diluted to 2.5 liters with methanol, heated to reflux, and then cooled to room temperature. A precipitate was formed and was recovered by filtration. Concentration of the filtrate yielded additional product. The solids were combined and extracted with methanol in a Soxhlet extractor. In this manner, 180 grams of dimethyl 2-(5-[4-((potassiumsulfo))phenoxy]pentoxy)-terephthalate were obtained as a white crystalline product. Another 100-milliliter portion of the methanolic dimethyl 2-(5-[4-sulfophenoxy]pentoxy)terephthalate solution obtained as described above was titrated with methanolic lithium hydroxide to pH 7.5. Upon evaporation of the solvent present, 31 grams of dimethyl 2-(5-[4-((lithiumsulfo))phenoxy]pentoxy)terephthalate were recovered as a solid residue product.

When employed as a modifier for a polyethylene terephthalate polyester in a manner similar to that described in Example I, the independent incorporation of both dimethyl 2-(5-[4-((potassiumsulfo))phenoxy]pentoxy)-terephthalate and dimethyl 2-(5-[4-((lithiumsulfo))-phenoxy]pentoxy)terephthalate resulted in the production of a crystalline polymer characterized by excellent dyeable fiber-forming and cold-drawing properties. In like manner, diethyl 2-(8-[4-((sodiumsulfo))phenoxy]octoxy)terephthalate, produced by the sulfonation of diethyl 2-(8-phenoxyoctoxy)terephthalate, followed by titration with sodium hydroxide is also employed to produce modified, dyeable fiber-forming polyethylene terephthalate polyesters.

What is claimed is:

1. A compound of the formula:

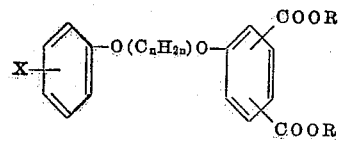

wherein X is selected from group consisting of the —$SO_3H$ and —$SO_3M$, M being an alkali metal atom, $n$ is an integer of from 1 to 12, and R is selected from the group consisting of hydrogen and alkyl containing from 1 to 8 carbon atoms.

2. A compound of the formula:

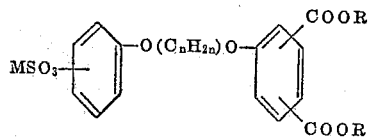

wherein M is an alkali metal atom having an atomic number of from 3 to 19, $n$ is an integer of from 1 to 8, and R is lower alkyl.

3. Dimethyl 5-(2-[4-((sodiumsulfo))phenoxy]ethoxy)-isophthalate.

4. Dibutyl 5-(2-[4-((potassiumsulfo))phenoxy]ethoxy)isophthalate.

5. Dimethyl 2-(5-[4-((potassiumsulfo))phenoxy]pentoxy)terephthalate.

6. Dimethyl 2-(5-[4-((lithiumsulfo))phenoxy]pentoxy)terephthalate.

7. Diethyl 2-(8-[4-((sodiumsulfo))phenoxy]octoxy)-terephthalate.

8. Dimethyl 5-(2-[4-sulfophenoxy]ethoxy)isophthalate.

9. Dimethyl 2-(5-[4-sulfophenoxy]pentoxy)terephthalate.

No references cited.